United States Patent
Tang et al.

(10) Patent No.: US 7,532,300 B2
(45) Date of Patent: May 12, 2009

(54) METHOD FOR PRODUCING ALIGNMENT LAYER FOR LIQUID CRYSTAL PANEL

(75) Inventors: Huang-Chin Tang, Hsinchu Hsien (TW); Chun-Hung Lin, Hsinchu Hsien (TW); Chih-Wei Chen, Hsinchu Hsien (TW); Chin-Jyi Wu, Hsinchu Hsien (TW); Chen-Der Tsai, Hsinchu Hsien (TW); Chin-Yang Lee, Hsinchu Hsien (TW)

(73) Assignee: Industrial Technology Research Institute, Chutung Chen, Hsinchu Hsien (TW)

( * ) Notice: Subject to any disclaimer, the term of this patent is extended or adjusted under 35 U.S.C. 154(b) by 351 days.

(21) Appl. No.: 11/503,191

(22) Filed: Aug. 14, 2006

(65) Prior Publication Data

US 2007/0128377 A1    Jun. 7, 2007

(30) Foreign Application Priority Data

Dec. 5, 2005    (TW) .............................. 94142736 A

(51) Int. Cl.
*G02F 1/13* (2006.01)
*C09K 19/00* (2006.01)

(52) U.S. Cl. .................. 349/187; 349/123; 349/125; 428/1.2

(58) Field of Classification Search .................. 349/187, 349/191, 123, 125, 126, 127, 128, 129, 130; 428/1.2

See application file for complete search history.

(56) References Cited

U.S. PATENT DOCUMENTS

| 4,402,999 | A | * | 9/1983 | Tatsumichi et al. | 427/126.3 |
| 5,719,653 | A | * | 2/1998 | Minato et al. | 349/156 |
| 6,665,033 | B2 | | 12/2003 | Callegari et al. | 349/123 |
| 6,788,381 | B2 | * | 9/2004 | Hachisu et al. | 349/172 |
| 2002/0113928 | A1 | * | 8/2002 | Hachisu et al. | 349/123 |
| 2007/0128377 | A1 | * | 6/2007 | Tang et al. | 428/1.2 |

* cited by examiner

*Primary Examiner*—Brian M Healy
(74) *Attorney, Agent, or Firm*—Birch, Stewart, Kolasch & Birch, LLP

(57) ABSTRACT

A method for producing an alignment layer for a liquid crystal panel, which is produced by modifying an alignment film in a fixed direction and at a fixed angle by using an atmospheric pressure plasma source to form a uniform and isotropic alignment layer on the surface of the substrate. The resultant alignment layer has good uniformity and high anchoring energy, and the pre-tilt angle can be selected as desired. In addition, there are no problems with static charge generation, dust pollution and the like as in the prior arts. The method of the present invention is not restricted by vacuum apparatuses that need ion alignment or vacuum plasma alignment and the like and is not restricted by the size of the equipment. Therefore, the method of the present invention is suitable for treating the surface of an alignment layer of a large size liquid crystal panel.

19 Claims, 2 Drawing Sheets

METHOD FOR PRODUCING ALIGNMENT LAYER FOR LIQUID CRYSTAL PANEL

FIELD OF THE INVENTION

The present invention relates to an alignment technique for a surface of a substrate, and more particularly, to a method for producing an alignment layer for a liquid crystal panel.

BACKGROUND OF THE INVENTION

In recent years, flat panel displays have become more and more integrated into daily life. Displays can be distinguished into two main types: cathode-ray tube displays and liquid crystal displays. Among them, the liquid crystal display (LCD) has advantages of light weight, small size, full-color display, less radiation, digitization, high definition, energy-saving and the like compared with the traditional cathode-ray tube displays. As a result, the liquid crystal display has definitely become the main trend in display technology.

The composition and the luminous principle of a liquid crystal display are very different from a cathode-ray tube. Briefly, a liquid crystal display controls the geometry of liquid crystals by using an electric field to alter the transport pathway and the phase of light, and cooperates with a polarizer to attain the effect of light-and-shade. By further cooperating with a drive circuit and color filters, the liquid crystal panel can display both gray scale and color images. The process for fabricating a liquid crystal display panel can be basically divided into an array and a color filter process, a liquid crystal cell process, and a module process.

For example, the method for fabricating a thin film transistor-liquid crystal display (TFT-LCD) commonly seen can be divided into three main processes: the first is a process for creating an array and a color filter for driving and creating signals; the second is a liquid crystal cell process for controlling, filling and sealing a liquid crystal; and the third is a module process for fabricating a polarizer, a back light module and the liquid crystal cell. Among them, a liquid crystal alignment technique in the liquid crystal cell process particularly plays a key role. In addition to playing a major role in controlling the arrangement and the orientation of liquid crystals, the liquid crystal alignment process further relates to high-quality display properties such as visual angle, response speed, contrast ratio, color expression, and so on.

The term "liquid crystal alignment" means to give liquid crystal molecules a direction, and the purpose is to make all or part of the liquid crystal molecules have a unified and uniform orientation or a fixed directional arrangement. The object of applying liquid crystal alignment in a liquid crystal display is that all or part of the liquid crystal molecules must have a synchronized and consistent motion when an electric field acts and drives the motion of the liquid crystal molecules, so that the action of displaying can be quick and uniform. Accordingly, there is a need of an alignment technique to attain the objective above. The alignment techniques commonly seen today are divided into a rubbing alignment technique and a non-rubbing alignment technique.

Rubbing alignment technique is a popular alignment technique used in the industry now. As shown in FIG. 1, basically, a substrate 1 such as an ITO glass substrate is set on a platform and moved unidirectionally to fix a Rayon cloth 15 having short and meticulous filaments onto an outside surface of a roller 13. The roller 13 is rotated with a speed of several hundreds revolutions per minute (rpm), so that the Rayon cloth 15 on the outside surface thereof is pressed into the material of an alignment layer 11 (for example, polyimide (PI)), which is preformed on the substrate. The surface of the alignment layer is rubbed with the short filaments at high speed to perform the rubbing process. After rubbing, the molecular arrangement on the surface of the material of the alignment layer 11 is under control and the molecules are arranged regularly along the direction of rubbing. Accordingly, the liquid crystals to be filled and sealed subsequently can also be arranged in alignment direction due to the force of interface.

The advantages of the rubbing alignment technique include a very short operation time for rubbing in a fixed direction, capability of being operated at normal temperature and excellent mass-production property. Thus, the rubbing alignment technique has continued to be used in the process for thin film transistor-liquid crystal displays in the fourth-generation LCD factories today. However, as progress is made towards the technical aims of high luminosity, large size, wide visual angle, and so on, the rubbing alignment technique has many problems that are difficult to solve. For example, the problems of dust pollution, residual static charge, rubbing defects and the like that are caused by rubbing a thin film in the rubbing process can easily result in reduced process yield and poor reliability. Therefore, under the demand for higher process yield for large-size liquid crystal panels in the fifth- and sixth-generation factories in the future, the utilization of a non-rubbing alignment technique is very desirable and, as such, an area of research and development. Presently, three types of non-rubbing techniques have been developed: a photo alignment technique, an ion beam alignment technique, and a plasma beam alignment technique.

The materials used in the photo alignment technique are mainly based on a high molecular thin film such as polyimide (PI). The high molecular thin film is irradiated by an ultraviolet light source having anisotropic energy, so that anisotropic photopolymerization, photoconvertion or photocracking occur in the high molecular structure on the surface of the thin film. As a result, an anisotropic van de Waal's force is generated on the surface of the thin film to induce the arrangement of the liquid crystal molecules. A linear polarized ultraviolet light source is mainly used in the ultraviolet photo alignment method. In this method, the ultraviolet light source is polarized by using a polarizer. Because the anisotropic energy of the ultraviolet light source is high and capable of inducing the anisotropic photoreaction to occur effectively, the ultraviolet light source is widely used in the study of photo alignment materials. The photo alignment technique is nearly ten years old and has the feature of good uniformity. However, there are technological bottlenecks such as anchoring energy, image sticking and the like that remain to be solved. Moreover, the problems of light bulb life and light flicker when using an exposure machine severely impact the stability.

The procedure for the ion beam alignment process is to bombard an inorganic or organic alignment thin film material with an ion beam at a determined angle. An anisotropic structure is created on the surface of the thin film material by selective bond cleavage, and there is an alignment effect to the liquid crystals. The design frameworks for ion beam alignment apparatuses are similar and generally include a vacuum chamber, an ion source, an electrical neutralizer for neutralizing ions and a movable and rotatable platform for setting a glass substrate. As disclosed in U.S. Pat. No. 6,665,033B2, IBM Corporation has provided an ion beam alignment apparatus that uses a Kaufman-type ion gun as an ion source. The method for creating the ions is that plasma is first generated within the ion gun, and then part of the cations in the plasma pass through a pinhole on a plate; the cations are attracted by the negative potential of an acceleration electrode and shoot from the ion gun with high speed, thus generating an ion beam to be used for the alignment process. To avoid excessive charge accumulating in the alignment film, the ion beam should be subject to charge neutralization with electrons excited by a hot filament, so that the alignment treating process can be carried out on only the alignment film.

Because there is a need for using high vacuum equipment and static charge elimination equipment in the process of ion beam alignment, the cost is very expensive. Furthermore, the creation of the vacuum needs a lot of time and is restricted by the size of the equipment. For larger-sized panels, it needs specially-made equipment that is extremely expensive. In addition, the problem of the relatively short life of the ion gun used in the process has not been overcome. Therefore, the ion beam alignment technique presently remains in the stage of laboratory development.

Plasma beam alignment is also called particle beam alignment. This plasma beam comprises ions, electrons, neutral gases, an ultraviolet ray and ultraviolet light. The most original concept of the plasma beam alignment comes from the short-range close drift technology in Soviet space research. Satellite technology was developed actively by the Soviet Union during the Cold War between the United States and the Soviet Union. Under the stringent demand of dynamic control of a satellite, the anode layer thruster (ALT) was developed, and the concept thereof has been extended to display technologies.

In the plasma beam alignment technique, a plasma source is generated by a direct current plasma system. Ion groups in the plasma are driven by a high electric field with positive bias created by a positive electrode, and an anode layer is generated to begin the alignment mechanism. Furthermore, the alignment film is subjected to surface modification treatment with the plasma. In addition to completely avoiding static charge generation and dust pollution, the plasma beam alignment technique has several other advantages: the alignment film treated by the plasma beam has the properties of photostability, alignment stability and the like; the plasma beam alignment technique can adjust the distribution range of the pre-tilt angle; and the expression of azimuthal anchoring energy can attain the same level as that of the photo alignment technique.

However, all of the plasma beam alignment techniques that have been disclosed in publications or patents use vacuum plasma equipment and thus the cost is very expensive. Furthermore, the creation of vacuum needs a lot of time and is restricted by the size of the equipment. For larger-sized panels, specially-made equipment is needed that is extremely expensive and occupies space for the equipment and the like. Thus, the plasma beam alignment technique also remains in the stage of laboratory development and hasn't attained industrial applicability.

Therefore, overcoming the existing problems disclosed in the prior arts is quite desirable.

SUMMARY OF THE INVENTION

In consideration of the drawbacks in the prior arts mentioned above, an objective of the present invention is to provide a method for producing an alignment layer for a liquid crystal panel to prevent static charge generation and dust pollution.

Another objective of the present invention is to provide a method for producing an alignment layer for a liquid crystal panel to be useful for treating the surface of an alignment layer of a large-sized liquid crystal panel.

Another objective of the present invention is to provide a method for producing an alignment layer for a liquid crystal panel that can reduce the cost of manufacture.

To achieve the above and the other objectives, the present invention provides a method for producing an alignment layer for a liquid crystal panel that comprises providing a substrate; coating or vapor depositing an organic or inorganic thin film as an alignment film; and modifying and aligning said alignment film in a fixed direction and a fixed angle by using an atmospheric pressure plasma source to form an alignment layer having uniform and regular molecular bonds on the surface of said substrate.

The material of said alignment layer may be selected from one of high molecular polymers, nitrides, oxides and diamond-like carbon films. In one preferred embodiment, the high molecular polymer is selected from one of polyimide, polymethyl methacrylate and polyvinyl cinnamate (PVCN); the nitride may be silicon nitride; and the oxide may be selected from one of silicon dioxide ($SiO_2$), aluminium oxide ($Al_2O_3$), cerium oxide ($CeO_2$), stannous oxide ($SnO_2$), zinc titanium oxide ($ZnTiO_2$) and indium titanium oxide ($InTiO_2$).

In the step of modifying the alignment film in a fixed direction and a fixed angle by using an atmospheric pressure plasma source, the substrate is set on a platform and moved unidirectionally or reciprocally to allow the atmospheric pressure plasma source to modify the alignment film in a fixed direction and at a fixed angle. In one preferred embodiment, the fixed angle may be in the range of 0° to less than 90° from the direction of the normal line of the atmospheric pressure plasma source opposite to the alignment film.

Said atmospheric pressure plasma source may be a high-energy ion source generated from atmospheric pressure plasma generation apparatus at an environmental pressure selected from one of normal pressure and rough vacuum. In one preferred embodiment, the rough vacuum pressure may be in the range of 100 Torr to 760 Torr; the atmospheric pressure plasma generation apparatus may be selected from one of corona discharge apparatus, atmospheric pressure glow discharge plasma, atmospheric pressure plasma jet and plasma torch; the ion source may be selected from one of electrons, ions, radicals, and neutral particles, or may be selected from at least two of electrons, ions, radicals, and neutral particles; the process gas used to generate the atmospheric pressure plasma source by the atmospheric pressure plasma generation apparatus may be a gas being dissociated at an environmental pressure selected from one of normal pressure and rough vacuum, preferably, and which is selected from the group consisting of air, dried air, oxygen, nitrogen, argon, aqueous vapor and helium.

Said substrate may be a glass substrate, and may further include a conducting layer such as indium tin oxide (ITO) preformed on the surface of said substrate. In one preferred embodiment, ITO glass substrate is used directly.

A method for producing an alignment layer for a liquid crystal panel provided by the present invention is mainly to modify an alignment film in a fixed direction and at a fixed angle by using an atmospheric pressure plasma source to form a uniform and isotropic alignment layer on the surface of the substrate. Therefore, the resultant alignment layer has good uniformity and high anchoring energy, and the pre-tilt angle can be selected as desired. In addition, because the modification of the alignment film on the surface of the substrate is performed by an atmospheric pressure plasma source, there are no problems of static charge generation, dust pollution and the like as in the prior arts. The method of the present invention does not require vacuum equipment. Compared with general vacuum plasma alignment techniques, the method of the present invention simplifies the alignment process and not only saves the time and space that would be required for the creation of a vacuum, but also is not restricted by the size of the vacuum equipment. Therefore, the method of the present invention is suitable for treating the surface of an alignment layer of large-sized liquid crystal panels, and can significantly reduce manufacture costs.

DETAILED DESCRIPTION OF THE EMBODIMENTS

The modes for carrying out the present invention are illustrated in the following by specific embodiments. A person skilled in the art can readily understand other advantages and effects of the present invention from the contents disclosed in this description. The present invention can also be carried out or applied by other differing embodiments. Details of this specification can be modified and altered based on different viewpoints and applications without departing from the scope of the present invention.

Figure 1:
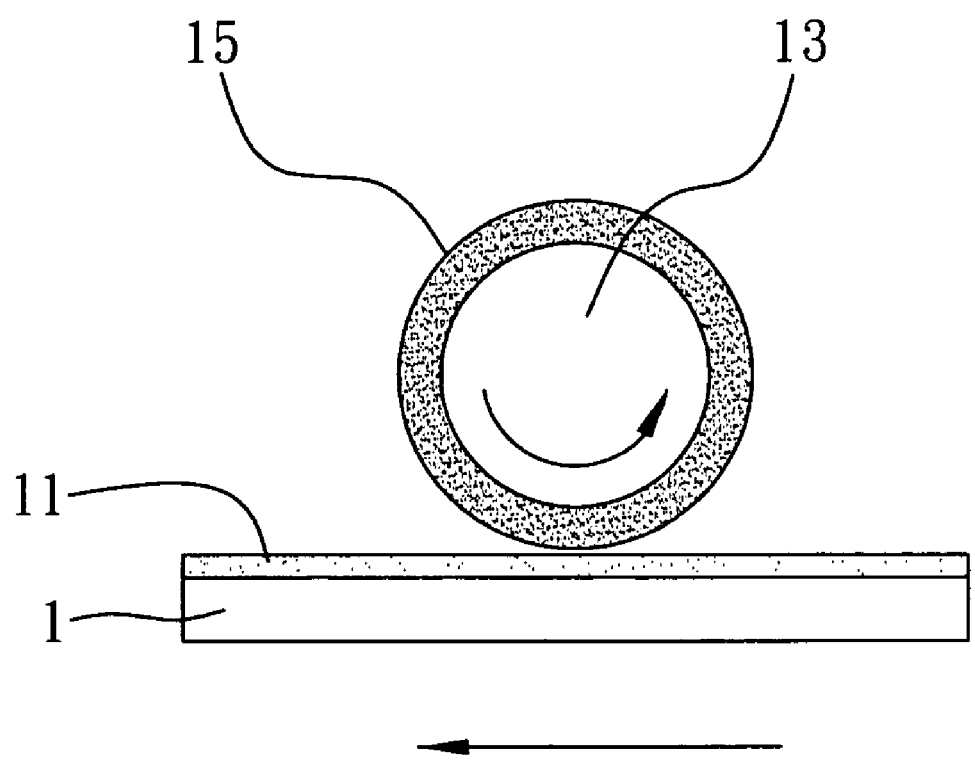
FIG. 1 is a cross-sectional view showing the conventional rubbing alignment process.
Figure 2A:
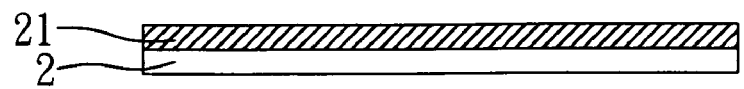
FIGS. 2A to 2C are cross-sectional views showing the flow of the method for producing an alignment layer for a liquid crystal panel of the present invention.
Figure 2B:
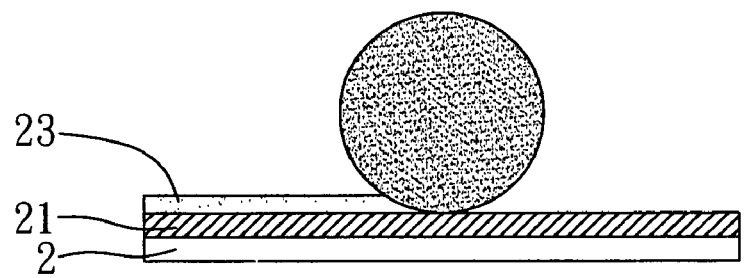
Figure 2C:
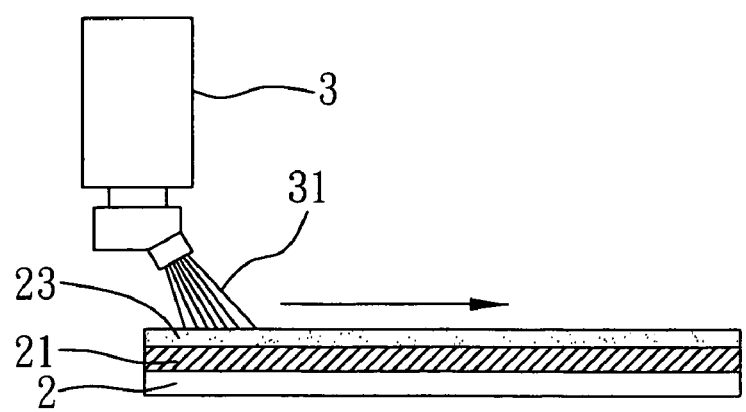

FIGS. 2A to 2C are views according to a preferred embodiment of the present invention. It should be noted that the appended views are simplified diagrams, and they are intended to explain the basic method of the present invention in a concise manner. Thus, only the steps that are related to the present invention are depicted in these diagrams, and the steps shown in the diagrams are not delineated to the extent needed for practical application. In fact, the process or the manner to implement the method in practice is a selective design matter, and the steps of the process would be more complicated in actual practice.

FIGS. 2A to 2C are flow diagrams showing the method for producing an alignment layer for a liquid crystal panel of the present invention. The process is illustrated with an atmospheric pressure plasma jet, which is a plasma generation apparatus manufactured by Plasma Treat, Germany (as described in U.S. Pat. No. 6,800,336). In addition to using the atmospheric pressure plasma jet, the present invention can cooperatively use a reciprocating platform, a material storage and discharge apparatus connecting to the atmospheric pressure plasma jet, and a control apparatus for controlling the operation of the alignment process and material discharge.

As shown in FIG. 2A, the method for producing an alignment layer for a liquid crystal panel provided by the present invention is firstly to prepare a substrate 2 with conducting layer 21 formed on the surface of said substrate 2. In the present embodiment, the substrate 2 is a glass substrate for a liquid crystal panel and the material of the conducting layer 21 is indium tin oxide (ITO). In other words, the substrate 2 on which the conducting layer 21 is formed is, for example, an ITO glass substrate. However, a person who has common knowledge about the technical field can understand that the substrate 2 having the conducting layer 21 is not restricted to the ITO glass substrate used in the present embodiment. Substrates having conducting layers made of different materials can also be employed in other embodiments.

Subsequently, as shown in FIG. 2B, the surface of the conducting layer 21 on said substrate 2 is coated with alignment film 23. In the present embodiment, the conducting layer 21 on the substrate 2 is coated with polyimide (PI) or the precursor thereof through dry process or wet process such as screen-printing. After drying and polymerization, a polyimide thin film is formed and then becomes the alignment layer 23 coated on said conducting layer 21. However, a person who has common knowledge about the technical field can understand that said alignment film is not restricted to the polyimide thin film used in the present embodiment, and the coating manner is not restricted to a wet process such as screen-printing. In other embodiments, another high molecular polymer, nitride, oxide or diamond-like carbon (DLC) film may also be used. The said high molecular polymer may be selected from polymethyl methacrylate (PMMA) or PVCN; the nitride may be silicon nitride ($SiN_x$); the oxide may be silicon dioxide ($SiO_2$), aluminium oxide ($Al_2O_3$), cerium oxide ($CeO_2$), stannous oxide ($SnO_2$), zinc titanium oxide ($ZnTiO_2$) or indium titanium oxide ($InTiO_2$).

Finally, as shown in FIG. 2C, the alignment film 23 is modified in a fixed direction and at a fixed angle by an atmospheric pressure plasma source 31, such that an alignment layer having uniform and regular molecular bonds is formed on the surface of said substrate 2. In the present embodiment, the substrate 2 is set on a platform (not shown) and moves unidirectionally or reciprocally to allow the atmospheric pressure plasma source 31 to modify the alignment film 23 in a fixed direction and at a fixed angle. The fixed angle is defined as an included angel between a normal line of the alignment film 23 and a virtual line passing the atmospheric pressure plasma source 31 and a virtual point onto which plasma generated by the atmospheric pressure plasma source 31 is projected, and is in the range of 0° to less than 90°.

In addition, the atmospheric pressure plasma source 31 is a high-energy ion source generated from atmospheric pressure plasma generation apparatus 3 at normal pressure environment. However, in other embodiments, a high-energy ion source can also be generated in a rough vacuum pressure environment, and the rough vacuum pressure is in the range of 100 Torr to 760 Torr. The atmospheric pressure plasma generation apparatus 3 shown in the present embodiment is an atmospheric pressure plasma jet. However, in other embodiments, generation apparatus selected from one of corona discharge apparatus, atmospheric pressure glow discharge plasma, and plasma torch can also be used.

The said ion source may be selected from one of electrons, ions, radicals or neutral particles; alternatively, it may also be selected from two of electrons, ions, radicals or neutral particles in combination. In addition, the process gas used to generate the atmospheric pressure plasma source 31 by the atmospheric pressure plasma generation apparatus 3 is a gas being dissociated at an environmental pressure selected from one of normal pressure and rough vacuum, such as one of air, dried air, oxygen, nitrogen, argon, aqueous vapor or helium. Moreover, in order to avoid decay after alignment that results in instability of the alignment, a gas containing hydrogen can be added for passivation treatment while the alignment is performed. Decay is prevented because hydrogen atoms can bond with dangling bonds generated after plasma beam treatment, and the stability of the alignment is improved, the hydrophobicity on the surface of the alignment film 23 is increased, and a larger pre-tilt angle is obtained.

As described in the above embodiments, the method for producing an alignment layer for a liquid crystal panel of the present invention mainly employs an atmospheric pressure plasma as an ion source, by utilizing the property of high energy ions and cooperating with a reciprocating platform and a plasma jet source to modify a surface coated with the alignment film 23 in a fixed direction and at a fixed angle. As a result, a uniform alignment layer having isotropic character is formed on the substrate 2. In addition to stabilizing the liquid crystal molecules filled and sealed and making them arrange isotropically, the method of the present invention can achieve the objective of alignment by regulating the process parameters for photoelectric properties such as the pre-tilt angle of the liquid crystal molecules and the like.

In addition, when the alignment process is performed by using atmospheric pressure plasma as an ion source, cell patterning can be performed. In consideration of the key demand for enlarging the size of the substrate, the design concept of the linear alignment of the anode layer thruster can effectively amplify the uniformity of the process. Furthermore, the present invention is the first to employ atmospheric pressure plasma technology to modify the surface of the alignment film, wherein liquid crystal molecules are aligned by oriented molecular arrangement. The atmospheric pressure plasma generation apparatus used in the present invention has small size requirements, such that the treatment area is not restricted by the size of the apparatus. In the manufacture of large-sized liquid crystal panels in the future, the method of the present invention does not have to be altered on a large scale to derive another generation. Therefore, the method of the present invention will make an unprecedented impact on the liquid crystal display industry.

As compared with conventional techniques, the method for producing an alignment layer for a liquid crystal panel provided by the present invention modifies the surface of an alignment layer in a fixed direction and at a fixed angle by using an atmospheric pressure plasma source to form a uniform and isotropic alignment layer on the surface of the substrate. Therefore, the resultant alignment layer has good uniformity and high anchoring energy, and the pre-tilt angle can be selected as desired. In addition, because the modification of the alignment film on the surface of the substrate is performed with an atmospheric pressure plasma source, there are no problems of static charge generation, dust pollution and the like as in the prior arts. The method of the present invention does not require vacuum equipment. As compared with general vacuum plasma alignment techniques, the method of the present invention simplifies the alignment step and not only saves the time and space that would be required for the creation of a vacuum, but also is not restricted by the size of the vacuum equipment. Therefore, the method of the present invention is suitable for treating the surface of an alignment layer of large-sized liquid crystal panels, and can significantly reduce manufacturing costs. Thus, the present invention has solved the existing problems in the prior arts. The above-mentioned embodiments are only to illustrate the principles and effects of the present invention and are not intended to limit the present invention. Anyone skilled in the art can modify and alter the above embodiments without departing from the scope of the present invention. Therefore, the protective range of the present invention should be as the claims recited in the following.

The invention claimed is:

1. A method for producing an alignment layer for a liquid crystal panel, the method comprising:
   providing a substrate;
   forming an alignment film on a surface of said substrate; and
   modifying said alignment film in a fixed direction and at a fixed angle by using an atmospheric pressure plasma source to form an alignment layer having uniform and regular molecular bonds on the surface of said substrate.

2. The method for producing an alignment layer for a liquid crystal panel according to claim 1, wherein the material of the alignment film is selected from one of high molecular polymers, nitrides, oxides and diamond-like carbon films.

3. The method for producing an alignment layer for a liquid crystal panel according to claim 2, wherein the high molecular polymer is selected from one of polyimide, polymethyl methacrylate and polyvinyl cinnamate (PVCN).

4. The method for producing an alignment layer for a liquid crystal panel according to claim 2, wherein the nitride is silicon nitride.

5. The method for producing an alignment layer for a liquid crystal panel according to claim 2, wherein the oxide is selected from one of silicon dioxide ($SiO_2$), aluminium oxide ($Al_2O_3$), cerium oxide ($CeO_2$), stannous oxide ($SnO_2$), zinc titanium oxide ($ZnTiO_2$) and indium titanium oxide ($InTiO_2$).

6. The method for producing an alignment layer for a liquid crystal panel according to claim 1, wherein the substrate is set on a platform and moved unidirectionally to allow the atmospheric pressure plasma source to modify the alignment film in a fixed direction and at a fixed angle.

7. The method for producing an alignment layer for a liquid crystal panel according to claim 1, wherein the substrate is set on a platform and moved reciprocally to allow the atmospheric pressure plasma source to modify the alignment film in a fixed direction and at a fixed angle.

8. The method for producing an alignment layer for a liquid crystal panel according to claim 1, wherein the fixed angle is defined as an included angel between a normal line of the alignment film and a virtual line passing the atmospheric pressure plasma source and a virtual point onto which plasma generated by the atmospheric pressure plasma source is projected, and is in the range of 0° to less than 90°.

9. The method for producing an alignment layer for a liquid crystal panel according to claim 1, wherein the atmospheric pressure plasma source is a high-energy ion source generated from atmospheric pressure plasma generation apparatus at an environmental pressure selected from one of normal pressure and rough vacuum.

10. The method for producing an alignment layer for a liquid crystal panel according to claim 9, wherein the rough vacuum has a pressure in the range of 100 Torr to 760 Torr.

11. The method for producing an alignment layer for a liquid crystal panel according to claim 9, wherein the atmospheric pressure plasma generation apparatus is selected from one of corona discharge apparatus, atmospheric pressure glow discharge plasma, atmospheric pressure plasma jet and plasma torch.

12. The method for producing an alignment layer for a liquid crystal panel according to claim 9, wherein the ion source is selected from one of electrons, ions, radicals and neutral particles.

13. The method for producing an alignment layer for a liquid crystal panel according to claim 9, wherein the ion source is selected from at least two of electrons, ions, radicals and neutral particles in combination.

14. The method for producing an alignment layer for a liquid crystal panel according to claim 9, wherein the process gas used to generate the atmospheric pressure plasma source by the atmospheric pressure plasma generation apparatus is selected from the group consisting of air, dried air, oxygen, nitrogen, argon, aqueous vapor and helium.

15. The method for producing an alignment layer for a liquid crystal panel according to claim 9, wherein the process gas used to generate the atmospheric pressure plasma source by the atmospheric pressure plasma generation apparatus is a gas being dissociated at an environmental pressure selected from one of normal pressure and rough vacuum.

16. The method for producing an alignment layer for a liquid crystal panel according to claim 1, further comprising preforming a conducting layer on the surface of the substrate.

17. The method for producing an alignment layer for a liquid crystal panel according to claim 16, wherein the substrate is a glass substrate.

18. The method for producing an alignment layer for a liquid crystal panel according to claim 16, wherein the material of the conducting layer is indium tin oxide (ITO).

19. The method for producing an alignment layer for a liquid crystal panel according to claim 1, wherein the substrate is a glass substrate.

* * * * *